United States Patent [19]

Wirges

[11] Patent Number: 4,948,104
[45] Date of Patent: Aug. 14, 1990

[54] GAS SPRING

[75] Inventor: Winfried Wirges, Koblenz, Fed. Rep. of Germany

[73] Assignee: Stabilus GmbH, Koblenz-Neuendorf, Fed. Rep. of Germany

[21] Appl. No.: 352,858

[22] Filed: May 17, 1989

[30] Foreign Application Priority Data

May 20, 1988 [DE] Fed. Rep. of Germany ....... 8806642

[51] Int. Cl.$^5$ .............................................. F16F 9/36
[52] U.S. Cl. ............................ 267/64.11; 188/322.17; 267/64.28
[58] Field of Search .......................... 267/64.11–64.28, 267/120, 124; 92/168, 165 R; 188/322.17, 322.16, 322.21, 269; 141/4, 5, 349, 9; 280/711

[56] References Cited

U.S. PATENT DOCUMENTS

| | | |
|---|---|---|
| 3,307,883 | 3/1967 | Wustenhagen et al. ...... 267/64.11 X |
| 3,856,287 | 12/1974 | Freitag ............................. 267/64.11 |
| 4,030,715 | 6/1977 | Duran ............................... 267/64.11 |
| 4,030,716 | 6/1977 | Freitag . |
| 4,044,866 | 8/1977 | Ishida .............................. 188/322.21 |
| 4,098,302 | 7/1978 | Freitag ......................... 267/64.11 X |
| 4,194,731 | 3/1980 | Marx ................................. 267/64.28 |
| 4,342,447 | 8/1982 | Marx ........................... 188/322.17 X |
| 4,360,192 | 11/1982 | Ishida .............................. 267/64.28 |
| 4,373,707 | 2/1983 | Mölders ........................ 267/120 X |
| 4,446,895 | 5/1984 | Kato ........................... 188/322.21 X |
| 4,475,577 | 10/1984 | Cubalchini ................. 188/322.21 X |
| 4,491,160 | 1/1985 | Axthammer et al. ............ 267/64.28 |
| 4,650,165 | 3/1987 | Siemann ........................ 267/120 X |
| 4,750,594 | 6/1988 | Siemann et al. ................ 188/322.17 |

FOREIGN PATENT DOCUMENTS

| | | |
|---|---|---|
| 1971284 | 8/1967 | Fed. Rep. of Germany . |
| 2447012 | 4/1976 | Fed. Rep. of Germany ... 267/64.11 |
| 984779 | 3/1965 | United Kingdom ............. 267/64.11 |

Primary Examiner—Douglas C. Butler
Attorney, Agent, or Firm—Brumbaugh, Graves, Donohue & Raymond

[57] ABSTRACT

According to an illustrative example of the invention, a gas spring comprises adjacent one end of the cylinder two axially spaced sealing rings, namely an axially inner and an axially outer sealing ring. A lubricant chamber is defined axially between the axially inner and the axially outer sealing rings. The axially inner sealing ring is pressure-resistant against the elevated gas pressure within the working chamber such as to maintain the pressure of gas within the working chamber at a level exceeding the pressure within the lubricant chamber.

21 Claims, 2 Drawing Sheets

GAS SPRING

BACKGROUND OF THE INVENTION

This invention relates to a gas spring in which the piston rod is continuously lubricated by a lubricant agent housed within a lubricant chamber adjacent to the end of the cylinder through which the piston rod is guided.

STATEMENT OF THE PRIOR ART

From German Utility Model No. 1,971,284, a gas spring has been known in which two axially spaced sealing rings are provided adjacent to one end of the cylinder. The piston rod passes through said axially spaced sealing rings. A lubricant chamber is defined between said sealing rings adjacent to the external surface of the piston rod. The axially outer sealing ring is responsible for maintaining the pressure of the gas within the working chamber. The axially inner sealing ring is such as to permit pressurization also of the lubricant chamber. The axially inner sealing ring must be of very precise design in order to prevent the loss of lubricant towards the working chamber. This is due to the fact that the elevated pressure prevails in both the lubricant chamber and the working chamber. As the outer sealing ring is responsible for the pressure maintenance, the pressurized gas can be introduced only after the outer sealing ring has been positioned and fixed in axial direction. This axially outer sealing ring can be located, however, only after the lubricant agent has been introduced into the lubricant chamber. This makes it further necessary to introduce the pressurized gas after the lubricant chamber has been filled with lubricant agent. The introduction of the pressurized gas through the filled lubricant chamber is, however, difficult and nearly impossible if the lubricant agent is a high viscous lubricant agent, and more particularly a lubricant grease. Therefore, it becomes necessary to fill the working chamber with the pressurized gas through a filling bore separate from the sealing rings and to close this filling bore after the pressurized gas has been introduced.

OBJECT OF THE INVENTION

In view of the above discussed disadvantages of the prior art gas spring, it is a primary object of the present invention to provide a gas spring in which the escape of lubricant towards the working chamber is substantially prevented and nevertheless a simplified gasket can be used between the lubricant chamber and the working chamber.

A further object of the invention is to provide a gas spring which can be easily filled across the piston rod sealing and guiding unit, even if very high viscous lubricant agents are used such as lubricant greases.

SUMMARY OF THE INVENTION

In view of the above objects and particularly in view of the above primary object, a gas spring comprises a cylinder member having an axis and defining a cavity therein. The gas spring further comprises a piston rod axially extending through at least one end of the cylinder member. This piston rod member extends through a piston rod guiding and sealing group adjacent to said at least one end of the cylinder member. The piston rod guiding and sealing group includes two axially spaced sealing arrangements, namely an axially outer sealing arrangement and an axially inner sealing arrangement, at least the latter one being axially fixed with respect to the cylinder member. These sealing arrangements are in sliding contact with an external surface of the piston rod member. A lubricant chamber is provided axially between said two sealing arrangements adjacent to said external surface of the piston rod member. The lubricant chamber contains a lubricant agent. A working chamber is provided within the cavity adjacent to the axially inner sealing arrangement. This working chamber contains a volume of pressurized gas. The axially inner sealing arrangement is a pressure-resistant sealing arrangement capable of maintaining the pressure of said volume of pressurized gas at a level exceeding the pressure within the lubricant chamber.

With the gas spring of the present invention, the pressure within the working chamber can be maintained over an extended period of lifetime of the gas spring at a level exceeding the pressure within the lubricant chamber. This pressure difference substantially prevents escape of the lubricant towards the working chamber. Therefore, the axially inner sealing arrangement can be of relatively simple construction. As the piston rod is continuously lubricated by the lubricant agent within the lubricant chamber, both sealing arrangements are not subjected to considerable wear conditions. The existence of the lubricant film on the rod at the location of engagement with the axially inner sealing arrangement improves gas tightness of the axially inner sealing arrangement. Also, the axially outer sealing arrangement can be a relatively inexpensive construction, because it is not subjected to the high pressure prevailing within the working chamber. As the pressure within the lubricant chamber is smaller than the pressure within the working chamber, there is no great risk of the lubricant agent escaping into the atmosphere. Preferably, one can maintain atmospheric pressure within the lubricant chamber.

According to a further aspect of the present invention, the axially outer sealing arrangement is mounted within said guiding and sealing group independently of positioning and fixation of said axially inner sealing arrangement such that said axially outer sealing arrangement can be positioned after said axially inner sealing arrangement has been positioned and axially fixed with respect to said cylinder member, and after said volume of pressurized gas has been introduced into the working chamber. This means that the pressurized gas can be introduced into the working chamber across the guiding and sealing unit before the lubricant agent is introduced. Any difficulties arising from the presence of a lubricant agent during filling operation are, therefore, suppressed.

In order to permit filling of the working chamber across the guiding and sealing unit, it is further proposed that the axially inner sealing arrangement acts as a one-way valve permitting the introduction of pressurized gas through said axially inner sealing arrangement into said working chamber.

The axially inner guiding and sealing arrangement may comprise an axially inner sealing member located axially between an axially inner sealing member support member and an axially outer sealing member support member. In such case the one-way valve function may be obtained in that said axially inner sealing member support member defines an annular deflection space adjacent to said axially inner sealing member, said deflection space permitting axially inwardly directed deflection of a radially inner portion of said axially inner sealing member in response to introducing pressurized gas into said working chamber across said axially inner sealing arrangement. In order to further simplify the axially inner sealing arrangement and to improve its sealing function, it is further proposed that said axially inner sealing member is in sealing engagement with both said external surface of said piston rod member and an internal surface of said cylinder member.

The axially inner sealing member support member may be fixed against axially inward movement by radially inward deformation of said cylinder member. This radially inward deformation may be such as to provide a radially inwardly directed annular bulge.

The axially outer sealing member support member may be axially fixed against outwardly directed movement by a support sleeve, said support sleeve being axially fixed with respect to said cylinder member by terminal abutment means of said cylinder member. This terminal abutment means of said cylinder member may be established by a radially inwardly flanged portion of the cylinder member.

The axially outer sealing arrangement may comprise an axially outer sealing member radially between the piston rod member and the support sleeve.

In order to provide a perfect protection against escape of the lubricating agent towards atmosphere the axially outer sealing member may be in sealing engagement with both the external surface of said piston rod member and an internal surface of said support sleeve.

The axially outer sealing member may be supported against axially outward movement by an annular closure member provided axially outwards of the axially outer sealing member and being axially fixed with respect to the cylinder member.

Preferably, the closure member is located radially inwards of the support sleeve supporting the axially inner sealing arrangement.

In order to facilitate mounting of the closure member after filling the working chamber and the lubricant chamber, the closure member may have a contour substantially free of radial overlapping with the terminal abutment means supporting the support sleeve.

The annular closure member may be axially fixed by snapping engagement with respect to the cylinder member. If a support sleeve is provided for supporting the inner sealing arrangement, the closure member may be in snapping engagement with this support sleeve.

The support sleeve may be integral with said axially outer sealing member support member.

The piston rod member may be provided with a piston unit inside said cavity, said piston unit dividing said working chamber into two working compartments, said working compartments being interconnected by passage means permitting gas exchange between said working compartments.

The invention further relates to a method of assembling a gas spring as defined above This method comprises the steps of (a) inserting the piston rod member with the piston unit into said cavity;

(b) inserting the axially inner sealing arrangement into said cavity and axially fixing said axially inner sealing arrangement with respect to said cylinder member against axial movement thereof;

(c) introducing a gas into said working chamber across said axially inner sealing arrangement such as to provide said volume of pressurized gas within said working chamber;

(d) introducing said lubricant agent into said lubricant chamber;

(e) closing said lubricant chamber by said axially outer sealing arrangement.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to an embodiment shown in the accompanying drawings, in which.

DESCRIPTION OF THE PREFERRED EMBODIMENT

Figure 1:
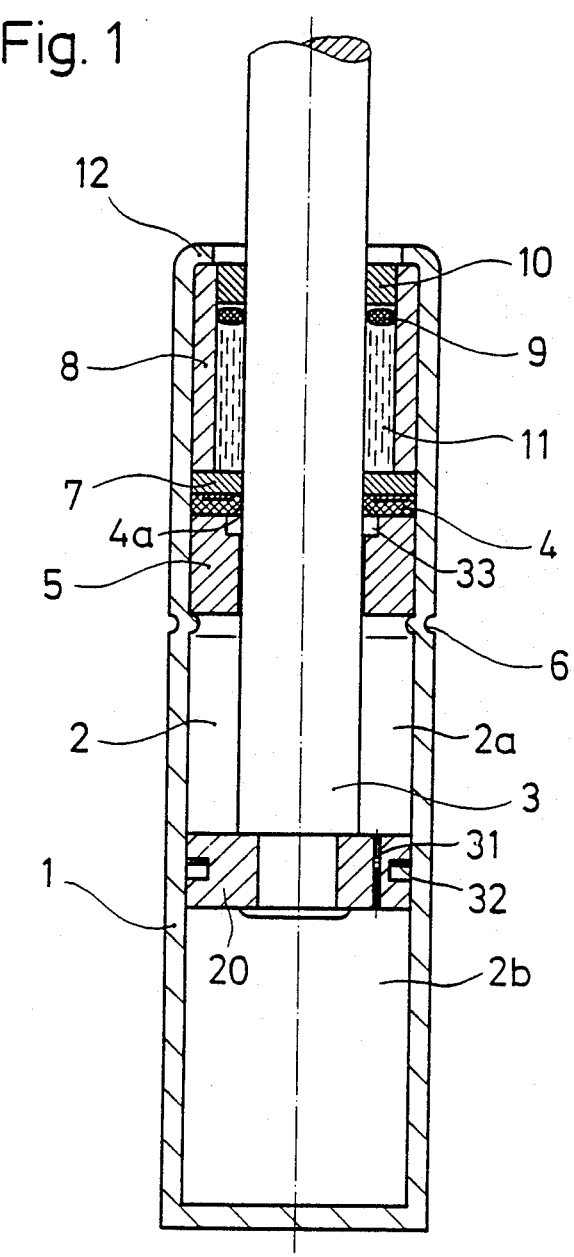
FIG. 1 shows a first embodiment of a gas spring according to this invention.

The gas-filled spring shown in FIG. 1 comprises a cylinder 1 in which slides a damper piston 20 which is connected to a piston rod 3. The bottom end of the cylinder 1 is occluded by a cylinder bottom which may be provided with an articulating eye, not shown in the drawings, by which the gas-filled spring can be attached to a component. In the working chamber 2 of the cylinder 1 there is a pressurized gas filling, this working chamber 2 being sealed by an axially inner sealing member 4 which is disposed axially between a piston rod guide member 5 and a disc 7. This sealing member 4 provides a seal in respect of both the piston rod 3 and the inside surface of the cylinder 1. As an abutment in an axially inward direction for the piston rod guide member 5, there is an encircling bead 6 in the cylinder 1. Acting on the disc 7 in axial direction, there is a support sleeve 8, the outside diameter of which is adapted to suit the inside diameter of the cylinder 1. This support sleeve 8 is pushed with a sliding fit into the cylinder 1 at the time of assembly. Axial fixing of the support sleeve 8, the disc 7, the inner sealing element 4 and the piston rod guide member 5 occurs through the flanged-over cylinder end 12. Formed between the inner wall surface of the support sleeve 8 and the piston rod 3 is an annular space 11 or lubricant chamber 11 which is filled with a lubricant and which is sealed from the outside ambient by a packing or sealing element 9 and a closure ring 10.

Assembly of the gas-filled spring is very simple, because once the piston rod 3 with the piston has been inserted into the cylinder 1, the encircling bead 6 is shaped and forms an abutment for the piston rod guide member 5 in an axial direction. After insertion of the piston rod guide member 5, the inner sealing member 4, the disc 7 and the support sleeve 8, an axial force is applied to the support sleeve 8, and the cylinder end 12 is flanged over so fixing the guide and sealing members for the piston rod 3. The interior 2 of the cylinder 1 of the working chamber 2 can now be filled with pressurized gas, the sealing element 4 being lifted off the external surface of the piston rod 3 by the filling pressure of the gas, so leaving a filling gap. When filling with gas is completed, the sealing element 4 returns to its sealing position on the piston rod 3, and the working chamber 2 is sealed in respect of the outside environment. Now the lubricant can be introduced into the lubricant chamber 11, and according to the intended use of the gas spring, such a lubricant may also be a thick-fluid lubricant or a lubricating grease. Then, by means of the outer sealing element 9 and the closure ring 10, the lubricant chamber 11 is closed off in respect of the outside environment. This lubricant chamber 11 is intentionally pressureless as a result of the pressure resistivity of the sealing element 4, so that the outer sealing element 9 serves only as a scraper or control element for lubricant entrained out of the outer sealing element by the piston rod. The pressure in the working chamber 2 exerts on the piston rod 3 a push-out force so that before the gas-filled spring is installed, the piston rod is normally fully extended. When the piston rod 3 is pushed into the cylinder 1, it first travels over the lubricant agent in the lubricant chamber 11, so ensuring that even after prolonged storage of the gas spring, the sealing element 4 is in contact with a well-lubricated piston rod so that there is extremely low wear and tear on the inner sealing element.

Figure 2:
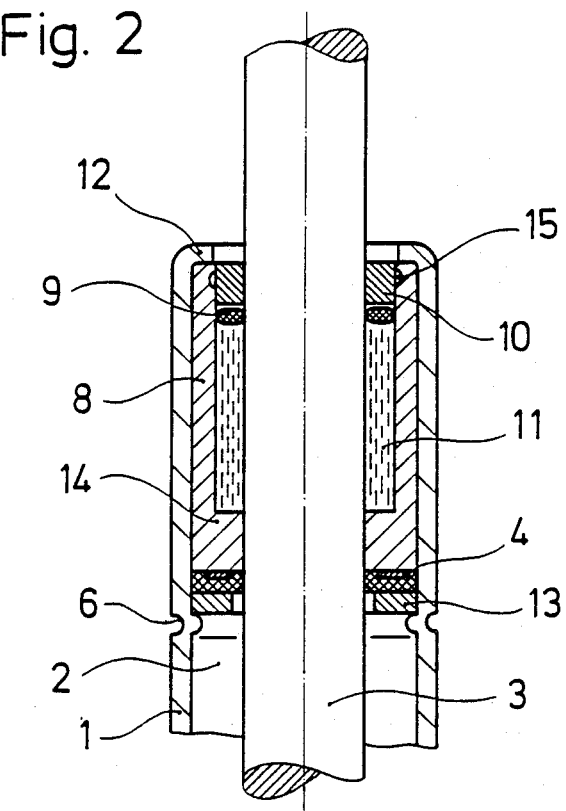
FIG. 2 shows a second embodiment of the gas spring according to this invention.

The embodiment according to FIG. 2 differs from that shown in FIG. 1 essentially in that there is a thrust ring bearing 13 on the inwardly projecting encircling bead 6 in the cylinder 1, which thrust ring forms an abutment surface for the inner sealing element 4. The piston rod guide 14 is formed integral with the support sleeve 8 such that the piston rod guide element 14 is maintained in abutting contact with the inner sealing element 4. The gas spring is occluded by flanging-over the cylinder end 12, so that the support sleeve 8 presses via the piston rod guide member 14 and the inner sealing element 4 against the thrust ring 13 and the bead 6. Introduction of pressurized gas into the cylinder 1 takes place as in the embodiment of FIG. 1. Equally, when the gas filling is completed, the lubricant chamber 11 is filled with lubricant, after which the outer sealing element 9 is inserted and the lubricant chamber 11 is closed by means of the closure ring 10. The closure ring 10 has on its outside diameter a plurality of projections 15 which engage a corresponding annular depression in the support sleeve 8 and so constitute a so-called snap-action joint.

As shown in FIG. 1, the piston 20 divides the working chamber 2 into two working compartments 2a and 2b which are interconnected by a throttled passage 31. A piston ring 32 may act as a one-way valve so as to increase the flow resistance on outward movement of the piston rod 3, and to reduce the flow resistance on inward movement of the piston rod 3. FIG. 1 shows a deflection space 33 into which the radially inner portion 4a of the inner sealing element 4 can be deflected during filling of the pressurized gas into the working chamber 2.

While a specific embodiment of the invention has been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:
1. A method of assembling a gas spring, said gas spring comprising a cylinder member (1) having an axis and defining a cavity therein, and further comprising a piston rod (3) axially extending through at least one end of said cylinder member (1), said piston rod member (3) extending through a piston rod guiding and sealing group (5, 4, 7, 8, 9, 10) adjacent to said at least one end of said cylinder member (1), said piston rod guiding and sealing group (5, 4, 8, 8, 9, 10) including two axially spaced sealing arrangements (4, 5, 7; 9, 10), namely an axially outer sealing arrangement (9, 10) and an axially inner sealing arrangement (4, 5, 7) axially fixed with respect to said cylinder member (2), said sealing arrangements (, 20; 4, 5, 7) being in sliding contact with an external surface of said piston rod member (3), a lubricant chamber (11) being provided axially between said two sealing arrangements (9, 10; 4, 5, 7) adjacent to said external surface of said piston rod member (3), said lubricant chamber (11) containing a lubricant agent, a working chamber (2) being provided within said cavity adjacent to said axially inner sealing arrangement (4, 5, 7), said working chamber (2) containing a volume of pressurized gas, said axially inner sealing arrangement (4, 5, 7) being a pressure-resistant sealing arrangement capable of maintaining the pressure of said volume of pressurized gas at a level exceeding the pressure within said lubricant chamber (11), said piston rod member (3) being connected with a piston unit (20) inside said cavity, said method comprising the following steps:

(a) inserting said piston rod member (3) with said piston unit (20) into said cavity;

(b) inserting said axially inner sealing arrangement (4, 5, 7) into said cavity and axially fixing said axially inner sealing arrangement (4, 5, 7) with respect to the said cylinder member (1) against axial movement thereof by inserting a support sleeve (8) along the inner wall surface of said cylinder member (1) and providing abutment means (12) adjacent the axially outer end of said cylinder member (1) abutting against the axially outer end of said support sleeve (8), said abutment means (12) being free of overlapping with the inner cross-sectional area of said support sleeve (8);

(c) introducing a gas into said working chamber (2) across said axially inner sealing arrangement (4, 5, 7) such as to provide said volume of pressurized gas within said working chamber (2);

(d) introducing said lubricant agent into said lubricant chamber (11);

(e) closing said lubricant chamber (11) by said axially outer sealing arrangement (9, 10) by inserting a sealing member (9) into said support sleeve (8) and thereupon inserting an annular closure member (10) into said support sleeve (8), such that said sealing member (9) is free of axial abutment against said support sleeve (8) in the axial inward direction and is supported in the axial outward direction by said closure member (10).

2. A gas spring comprising a cylinder member (1) having an axis and defining a cavity therein, and further comprising a piston rod (3) axially extending through at least one end of said cylinder member (1), said piston rod member (3) extending through a piston rod guiding and sealing group (5, 4, 7, 8, 9, 10) adjacent to said at least one end of said cylinder member (1), said piston rod guiding and sealing group (5, 4, 8, 8, 9, 10) including two axially spaced sealing arrangements (4, 5, 7; 9, 10), namely an axially outer sealing arrangement (9, 10) and an axially inner sealing arrangement (4, 5, 7) axially fixed with respect to said cylinder member (1), said sealing arrangements (9, 10; 4, 5, 7) being in sliding contact with an external surface of said piston rod member (3), a lubricant chamber (11) being provided axially between said two sealing arrangements (9, 20; 4, 5, 7) adjacent to said external surface of said piston rod member 93), said lubricant chamber (11) containing a lubricant agent, a working chamber (2) being provided within said cavity adjacent to said axially inner sealing arrangement (4, 5, 7), said working chamber (2) containing a volume of pressurized gas, said axially inner sealing arrangement (4, 5, 7) comprising a pressure-resistant sealing arrangement capable of maintaining the pressure of said volume of pressurized gas at a level exceeding the pressure within said lubricant chamber (11), said axially outer sealing arrangement (9, 10) comprising an axially outer sealing member (9) supported against axially outward movement by an annular closure member (10) provided axially outwards of said axially outer sealing member (9) and being axially fixed with respect to said cylinder member (1), said closure member (10) being located radially inwards of a support sleeve (9) supporting said axially inner sealing arrangement (4, 5, 7), and said support sleeve (8) being axially positioned by terminal abutment means (12) of said cylinder member (1), said closure member (10) having a contour substantially free of radially overlapping with said terminal abutment means (12).

3. A gas spring as set forth in claim 2, said axially outer sealing arrangement (9, 10) being mounted within said guiding and sealing group (5, 4, 7, 8, 9, 10) independently of positioning and fixation of said axially inner sealing arrangement (4, 5, 7) such that said axially outer sealing arrangement (9, 10) can be positioned after said axially inner sealing arrangement (4, 5, 7) has been positioned and axially fixed with respect to said cylinder member (1) and after said volume of pressurized gas has been introduced into said working chamber (2).

4. A gas spring as set forth in claim 2, said axially inner sealing arrangement (4, 5, 7) acting as a one-way valve permitting the introduction of pressurized gas through said axially inner sealing arrangement (4, 5, 7) into said working chamber (2).

5. A gas spring as set forth in claim 2, said axially inner sealing arrangement (4, 5, 7) comprising an axially inner sealing member (4) located axially between an axially inner sealing member support member (5) and an axially outer sealing member support member (7).

6. A gas spring as set forth in claim 5, said axially inner sealing member support member (5) defining an annular deflection space (33) adjacent to said axially inner sealing member (4), said deflection space (33) permitting axially inwardly directed deflection of a radially inner portion (4a) of said axially inner sealing member (4) in response to introducing pressurized gas into said working chamber (2) across said axially inner sealing arrangement (4, 5, 7).

7. A gas spring as set forth in claim 5, said axially inner sealing member support member (5) being fixed against axially inward movement by radially inward deformation (6) of said cylinder member (1).

8. A gas spring as set forth in claim 5, said axially outer sealing member support member (7) being axially fixed against outwardly directed movement by a support sleeve (8), said support sleeve (8) being axially fixed with respect to said cylinder member (1) by terminal abutment means (12) of said cylinder member (1).

9. A gas spring as set forth in claim 8, said terminal abutment means (12) of said cylinder member (1) being established by a radially inwardly flanged end portion (12) of said cylinder member (1).

10. A gas spring as set forth in claim 8, said axially outer sealing arrangement (9, 10) comprising an axially outer sealing member (9) radially between said piston rod member (3) and said support sleeve (8).

11. A gas spring as set forth in claim 10, said axially outer sealing member (9) being in sealing engagement with both the external surface of said piston rod member (3) and an internal surface of said support sleeve (8).

12. A gas spring as set forth in claim 8, said support sleeve (8) being integral with said axially outer sealing member support member (14).

13. A gas spring as set forth in claim 2, said axially inner sealing member (4) being in sealing engagement with both said external surface of said piston rod member (3) and an internal surface of said cylinder member (1).

14. A gas spring as set forth in claim 2, said annular closure member (10) being axially fixed by snapping engagement with respect to said cylinder member (1).

15. A gas spring as set forth in claim 14, said closure member (10) being in snapping engagement with a support sleeve (8) supporting said inner sealing arrangement (4, 5, 7).

16. A gas spring as set forth in claim 2, said piston rod member (3) being provided with a piston unit (20) inside said cavity, said piston unit (20) dividing said working chamber (2) into two working compartments (2a, 2b), said working compartments (2a, 2b) being interconnected by passage means (31, 32) permitting gas exchange between said working compartments (2a, 2b).

17. A gas spring as set forth in claim 2, said lubricant agent being an oil of high viscosity.

18. A gas spring as set forth in claim 2, said lubricant being a lubricating grease.

19. A gas spring as set forth in claim 2, substantially atmospheric pressure prevailing within said lubricant chamber.

20. A gas spring as set forth in claim 2, wherein said axially outer sealing member (9), is free of abutting support by said support sleeve (8) against axially inward movement.

21. A gas spring as set forth in claim 2, wherein said support sleeve (8) is cylindrical at its axially outer end and over at least a major portion of its axial length, the cylindrical portion of said sleeve (8) extending into engagement with said terminal support means (12) at said at least one end of said cylinder member (1).

* * * * *

UNITED STATES PATENT AND TRADEMARK OFFICE
CERTIFICATE OF CORRECTION

PATENT NO. : 4,948,104

DATED : August 14, 1990

INVENTOR(S) : Winfried Wirges

It is certified that error appears in the above-identified patent and that said Letters Patent is hereby corrected as shown below:

Col. 5, line 6, "thick-fluid" should read --thickly-fluid--;
Col. 6, line 13, "(2)" should read --(1)--;
Col. 6, line 14, "(, 20;" should read --(9, 10;--;
Col. 7, line 9, "(9, 20;" should read --(9, 10;--;
Col. 7, line 11, "93)" should read --(3)--;
Col. 7, line 30, "(9)" should read --(8)--.

Signed and Sealed this

Third Day of March, 1992

Attest:

HARRY F. MANBECK, JR.

*Attesting Officer*   *Commissioner of Patents and Trademarks*